United States Patent

Stricharczuk et al.

[11] Patent Number: 5,438,093
[45] Date of Patent: Aug. 1, 1995

[54] MODIFIED POLYCYCLOOLEFINS

[75] Inventors: Paul T. Stricharczuk, Twinsburg; Robert J. Minchak, Parma Heights; Timothy J. Kettering, Middleburg Heights; Dennis J. Janda, Parma; Glen R. Gribble, Jr., Barberton, all of Ohio

[73] Assignee: B. F. Goodrich Company, Akron, Ohio

[21] Appl. No.: 905,197

[22] Filed: Jun. 26, 1992

Related U.S. Application Data

[63] Continuation of Ser. No. 810,359, Dec. 18, 1991, abandoned, which is a continuation of Ser. No. 511,698, Apr. 20, 1990, abandoned, which is a continuation of Ser. No. 275,182, Nov. 23, 1988, abandoned, which is a continuation-in-part of Ser. No. 118,571, Nov. 9, 1987, abandoned, which is a continuation-in-part of Ser. No. 933,426, Nov. 21, 1986, abandoned.

[51] Int. Cl.$^6$ .............. C08F 4/629; C08F 4/628; C08F 32/06
[52] U.S. Cl. .............. 524/708; 524/720; 524/758; 524/773; 524/776; 525/210; 525/211; 525/289; 526/122; 526/127; 526/128; 526/132; 526/133; 526/281; 526/283; 526/150; 526/282
[58] Field of Search .............. 526/127, 122, 125, 133, 526/149, 150, 151, 128; 524/708, 720, 758, 773, 776; 525/210, 211, 289

[56] References Cited

U.S. PATENT DOCUMENTS

| | | | |
|---|---|---|---|
| 3,790,544 | 2/1974 | Maertens et al. | 526/127 |
| 3,857,825 | 12/1974 | Streck et al. | 526/308 |
| 3,883,495 | 5/1975 | Maertens et al. | 526/142 |
| 4,080,491 | 3/1978 | Kobayashi et al. | 521/127 |
| 4,400,340 | 8/1983 | Klosiewicz | 526/142 |
| 4,426,502 | 1/1984 | Minchak | 526/172 |
| 4,481,344 | 11/1984 | Newburg | 526/143 |
| 4,485,208 | 11/1984 | Klosiewicz | 526/142 |
| 4,607,077 | 8/1986 | Silver et al. | 526/193 |
| 4,696,985 | 9/1987 | Martin | 526/119 |

*Primary Examiner*—Edward J. Smith
*Attorney, Agent, or Firm*—Millen, White, Zelano & Branigan

[57] ABSTRACT

Solution and RIM polymerization of cycloolefins containing at least one norbornene moiety is carried out in the presence of a methathesis catalyst system and an activator, particularly a chlorosilane activator, to obtain faster reaction with higher conversions at lower mold temperatures. The methathesis catalyst system includes an organoammonium molybdate or tungstate catalyst and an alkylaluminum or an alkylaluminum halide cocatalyst. The chlorosilane activator is used at a level of 0.05 to 10 millimoles per mole of the cycloolefin monomers. The polymers of cycloolefins can be impact modified and/or flame-retarded.

32 Claims, No Drawings

MODIFIED POLYCYCLOOLEFINS

This is a application is a continuation of Ser. No. 07/810,359, filed Dec. 18, 1991, now abandoned, entitled "Modified Polycyclolefins," which is a continuation of application Ser. No. 07/511,698, filed Apr. 20, 1990, now abandoned, which is a continuation of application Ser. No. 07/275,182, filed Nov. 23, 1988, entitled "Modified Polycycloolefins," which, in turn, is a continuation-in-part of application Ser. No. 07/118,571, filed Nov. 9, 1987, entitled "Modified Polycycloolefins," which, in turn, is a continuation-in-part of application Ser. No. 06/933,426, filed Nov. 21, 1986, entitles "Modified Polycycloolefins", all now abandoned.

BACKGROUND OF THE INVENTION

Polymers of cycloolefins containing a norbornene moiety are well known. Such polymers can be prepared by ring opening polymerization of monomers in the presence of a methathesis catalyst system composed of an alkylaluminum halide cocatalyst and a tungsten or a molybdenum compound catalyst. Such polymerization is accomplished by mixing a cycloolefin, with or without other copolymerizable monomers, with a hydrocarbon solvent in a reactor, adding thereto a molecular weight modifier followed by the alkylaluminum halide cocatalyst and a tungsten or a molybdenum compound catalyst. This solution polymerization reaction is conducted at $-30°$ to $100°$ C. with stirring, and is mildly exothermic. Polymerization is completed in less than about two hours with the recovery of a smooth, viscous polymer cement of honey-like consistency that comprises a polymer dissolved in the solvent. This is a description of a typical solution polymerization process and product.

Bulk polymerization is polymerization that is carried out in the absence of a solvent or a diluent. Reaction injection molding or RIM is a type of bulk polymerization wherein a monomer in a liquid state is transferred or is injected into a mold where polymerization of the monomer takes place in the presence of a catalyst system. RIM is not conventional injection molding and is readily distinguishable therefrom.

RIM is a low pressure, one-step or one-shot, mix and injection of two or more liquid components into a closed mold where rapid polymerization occurs resulting in a molded plastic product. RIM differs from injection molding in a number of important respects. Injection molding is conducted at pressures of about 10,000 to 20,000 psi in the mold cavity by melting a solid resin and conveying it into a mold maintained at a temperature less than the $T_G$ of the resin with the molten resin at about 150° to 350° C. At an injection temperature of about 150° to 350° C., viscosity of the molten resin in an injection molding process is generally in the range of 50,000 to 1,000,000 and typically about 200,000 cps. In the injection molding process, solidification of the resin occurs in about 10 to 90 seconds, depending on the size of the molded product, following which, the molded product is removed from the mold. There is no chemical reaction taking place in an injection molding process when the resin is introduced into a mold.

In a RIM process, viscosity of the materials fed to a mix chamber is about 1 to 10,000 cps, preferably 1 to about 1500 cps, at injection temperatures varying from room temperature for urethanes to about 100° C. for lactams. Mold temperatures in a RIM process are in the range of about 50° to 150° C. and pressures in the mold are generally in the range of about 50 to 150 psi. At least one component in the RIM formulation is a monomer that is polymerized to a polymer in the mold. The main distinction between injection molding and RIM resides in the fact that in RIM, a chemical reaction is initiated on mixing, and is completed in the mold to transform monomers to a polymeric state. For practical purposes, the chemical reaction must take place rapidly in less than about 2 minutes. U.S. Pat. No. 4,426,502 to Minchak describes bulk polymerization of cycloolefins using a modified cocatalyst with a catalyst whereby polymerization of the cycloolefin monomers can be conducted in absence of a solvent or a diluent. The alkylaluminum halide cocatalyst is modified by pre-reacting it with an alcohol or an active hydroxy-containing compound to form an alkoxyalkylaluminum halide or an aryloxyalkylaluminum halide which is then used in the polymerization reaction. The pre-reaction can be accomplished by using oxygen, an alcohol, or a phenol. Such modification of the cocatalyst results in lowering of its reducing potential.

It is important to lower the reducing power of the cocatalyst in order to make such bulk polymerization reactions practical. When an unmodified alkylaluminum halide cocatalyst is diluted with monomer and mixed with a monomer-diluted catalyst to polymerize a cycloolefin, the reaction is very rapid. In such systems, the polymerization is usually unacceptable because polymer formed at the interfaces of the two streams during intermingling prevents thorough mixing and results in poor conversions. Modifying the cocatalyst by pre-reaction with hydroxy-containing materials reduces the activity of the cocatalyst to the point where adequate mixing of the liquid components can occur and acceptable polymer products can be produced. Sometimes, a cycloolefinic monomer will contain various impurities that naturally reduce the activity of the cocatalyst. In such cases, it is not necessary to add active hydroxy-containing materials to reduce the activity of the cocatalyst. With the modified cocatalyst, mixing of the cycloolefins, and other components, can be carried out without immediately initiating polymerization. The cocatalyst can be formulated to allow a reasonable pot life at room temperature and thermal activation in the mold of the mixed liquid components. The cocatalyst can also be formulated to give mixing initiated RIM systems.

U.S. Pat. No. 4,380,617 to Minchak et al discloses the use of organoammonium molybdates and tungstates in the polymerization of cycloolefins. The organoammonium molybdate and tungstate catalysts are soluble in cycloolefins and in hydrocarbon solvents and therefore, do not require the use of an alkylester solvent, which caused problems in the prior art polymerizations, to solubilize them. Furthermore, since the catalyst is soluble in cycloolefins, polymerization of the cycloolefins in bulk is thereby facilitated.

The Oreshkin et al article in *European Polymer Journal*, 13 (1977) on pp 447–450, reports the use of silane compounds as cocatalysts with molybdenum and tungsten catalysts in ring opening polymerization. Many of the silane compounds noted by the prior art article were tried in ring opening polymerization, however, it has since been determined in our laboratories that it is necessary to also include an organoaluminum reducing agent, such as triethylaluminum or diethylaluminum chloride, in order to carry out the ring opening polymerization.

Hercules U.S. Pat. No. 4,481,344 discloses that high conversions can be obtained by ring opening polymerization of DCPD in the presence of a methathesis catalyst system and also in the presence of a halogen-containing hydrocarbyl additive which contains at least one trihalogen substituted carbon atom or at least one activated halogen atom. Examples of the additives are given at about the middle of col. 3 of this patent. Contrary to allegations made in this Hercules patent pertaining to the high degree of conversion, the use of ethyl trichloroacetate in our polymerization system resulted in conversions of only 92% and 94%. The Hercules patent uses a toluene extraction, gas chromatographic (GC) method of determining monomer conversions whereas the conversions given herein were obtained by thermogravimetric (TG) analysis wherein weight loss prior to 400° C. was counted as unconverted monomer. Whereas Hercules reports conversions of 99% by the GC method, the TG analysis used herein gives conversions of only 92–94%. Heat distortion temperature (HDT) of the polymers of the Hercules patent is believed to be about 85°–95° C.

U.S. Pat. No. 3,857,825 to Streck et al appears to be directed to solution polymerization. The object in the Streck patent disclosure is to introduce the reactive silyl groups on ends of the polymer whereas the object herein is to increase conversion rate for bulk polymerization to in excess of 95% and to reduce the mold temperature. Over the range of 0.05–10 millimoles, silyl groups are not introduced on ends of polymers and the polymers obtained herein do not have silyl groups on their ends.

Cocatalyst compound is defined by the formula

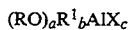

$(RO)_a R^1_b AlX_c$ wherein R and $R^1$ are individually selected from hydrogen, alkyl, aryl, alkenyl, alkaryl, and saturated and unsaturated monocyclic, dicyclic, and polycyclic groups; X is a halogen; and a, b, and c are equivalents of RO, R, and X, respectively, where a is 0–2, b is 0.6–3, and c is 0–2, provided that the sum of a, b, and c is 3.

SUMMARY OF THE INVENTION

Ring opening polymerization of cyclic olefins containing a norbornene group is carried out in bulk, one example being reaction injection molding, or by means of solution polymerization in the presence of a catalyst, cocatalyst, and a chlorosilane activator to prepare thermoplastic or thermoset polymers. In a preferred embodiment, the catalyst is an organoammonium molybdate or tungstate, the cocatalyst is an alkoxyalkylaluminum chloride, and the activator is an alkylchlorosilane or tetrachlorosilane. Amount of the activator is 0.05 to 10.0 millimoles per mole of the cycloolefin monomers that are polymerized.

DETAILED DESCRIPTION OF INVENTION

This invention pertains to solution polymerization and to bulk polymerization (including RIM) of cycloolefin monomers which contain a norbornene moiety. As used herein, bulk polymerization encompasses reaction injection molding wherein at least one monomer, catalyst, cocatalyst and an activator are mixed and then injected into a mold where polymerization and hardening of the polymer takes place quickly in a matter of less than 10 minutes, preferably less than 2 minutes, depending on the size and thickness of the molded object and other variables. The mold is normally preheated in order to facilitate the polymerization reaction in the mold.

The catalyst useful herein is selected from ring-opening methathesis catalysts. In this type of polymerization, the rings of the monomers are opened at a norbornenyl double bond to form amorphous or partially crystalline polymers containing backbone unsaturation. The methathesis catalysts include molybdenum compounds and tungsten compounds such as the molybdenum and tungsten halides, particularly molybdenum pentachloride and tungsten hexachloride, or variations thereof. The molybdenum and tungsten halides are unstable in air and react with oxygen or moisture. For this reason, these catalysts are blanketed with pure, dry nitrogen. The ring-opening metathesis catalyst system suitable for polymerizing norbornene-type monomers described herein is devoid of ethers and the catalyst is not suspended in a small amount of solvent, nor is it solubilized by the addition of an alcoholic or a phenolic compound, nor a Lewis base or achelating agent is added to prevent premature polymerization of the catalyst monomer system, as is disclosed by Klosiewicz U.S. Pat. No. 4,400,340.

The molybdenum and tungsten halide catalysts start polymerizing the cycloolefin monomer even on standing at room temperature. A polymer begins to form within several hours on standing at room temperature, the polymer being in the form of an undesirable grainy mass of gelled polymer particles in unreacted monomer.

To overcome the disadvantages noted above, the catalysts are used in the form of organo-ammonium molybdates and tungstates, described in the Minchak U.S. Pat. No. 4,426,502. These catalysts are soluble in cycloolefin monomers, can be handled at room temperature in a room environment since they are stable in the presence of air and moisture, and they do not prematurely polymerize the cycloolefins at room temperature when mixed with them. In a preferred embodiment, the ammonium molybdate and tungstate catalysts are used in a monomer solution to facilitate mixing the catalyst with the other ingredients of the polymerization system.

The ammonium or organoammonium molybdates and tungstates suitable herein as catalysts are devoid of phosphorus and are defined as follows:

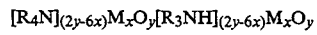

$[R_4N]_{(2y-6x)}M_xO_y [R_3NH]_{(2y-6x)}M_xO_y$ where O represents oxygen; M represents either molybdenum or tungsten; x and y represent the number of M and O atoms, respectively, in the molecule based on the valence of +6 for molybdenum, +6 for tungsten, and −2 for oxygen.

In a preferred embodiment, the R radicals are selected from alkyl groups each containing 1 to 18 carbon atoms wherein the sum of carbon atoms on all the R radicals is from 20 to 72, more preferably from 25 to 48. In a preferred embodiment, the R radicals are selected from alkyl groups each containing from 1 to 18 carbon atoms wherein the sum of carbon atoms on all of the R radicals is from 15 to 54, more preferably from 21 to 42.

Specific examples of suitable organoammonium molybdates and tungstates described herein include tridodecylammonium molybdates and tungstates, methyltricaprylammonium molybdates and tungstates, tri(tridecyl)ammonium molybdates and tungstates, and the like.

The organoammonium molybdate or tungstate or a mixture thereof, is employed at a level of about 0.005 to 50 millimoles molybdenum or tungsten per mole of total monomer, preferably 0.05 to 5.0 millimoles.

The alkylaluminum halide or alkylaluminum cocatalyst that is used in conjunction with at least one organoammonium molybdate or tungstate as a polymerization catalyst is selected from monoalkylaluminum dihalides, $RAlX_2$, dialkylaluminum monohalides, $R_2AlX$, alkylaluminum sesquihalides, $R_3Al_2X_3$, trialkylaluminum, $R_3Al$, dialkylalkoxyaluminum, dialkoxyalkylaluminum and mixtures thereof, including dialkylaluminum chlorides, alkylaluminum sesquichlorides, alkyl aluminum dichlorides, alkoxyalkyl aluminum chlorides, and aryloxy alkyl aluminum chlorides. In the formulas for the alkylaluminum cocatalysts, R is an alkyl radical containing 1 to 12 carbon atoms, preferably about 2 to 8 carbon atoms, and X is a halogen selected from chlorine, iodine, bromine and fluorine. Specific examples of such alkylaluminum halides and alkyl aluminums include ethylaluminumdichloride, diethylaluminum monochloride, ethylaluminum sesquichloride, diethylaluminum iodide, ethylaluminum diiodide, propylaluminum dichloride, propylaluminum diiodide, isobutylaluminum dichloride, ethylaluminum dibromide, methylaluminum sesquichloride, methylaluminum sesquibromide, trioctylaluminum, triethylaluminum and triisobutylaluminum.

U.S. Pat. No. 4,426,502 to Minchak describes polymerization of cycloolefins using a modified alkylaluminum halide cocatalyst. The cocatalyst is modified by pre-reacting an alkylaluminum halide with an alcohol or an active hydroxy-containing compound to form an alkoxyalkylaluminum halide or an aryloxyalkylaluminum halide which is then used in the polymerization reaction. The pre-reaction can be accomplished by using oxygen, an alcohol, or a phenol. The same thing can be accomplished by conducting the reaction in situ, i.e., by reacting alkylaluminum halide with alcohol in situ. The alkoxy or aryloxy group on the cocatalyst functions to inhibit the reducing power of the cocatalyst by replacing some of the alkyl groups on the aluminum. This makes it possible to adequately mix all the catalyst components and to react cyclic olefins by means of bulk polymerization.

The molar ratio of the alkylaluminum halide to the organoammonium molybdate and/or tungstate is not critical and can be in the range of about 200:1 or more to 1:10, preferably from 10:1 to 2:1 of aluminum to molybdenum or tungsten.

The cycloolefin monomers that can be polymerized in accordance with the processes described herein are norbornene-type monomers which are characterized by the presence of at least one norbornene moiety in its structure identified below:

Suitable cycloolefin monomers are devoid of a polar group and include substituted and unsubstituted norbornenes, dicyclopentadienes, dihydrodicyclopentadienes, trimers of cyclopentadiene, tetracyclododecenes, hexacycloheptadecenes, ethylidenenorbornenes and vinyl norbornenes and alkyl or alkenyl norbornenes containing 1 to 12 carbon atoms in the alkyl or alkenyl group. Substituents on the cycloolefin monomers include hydrogen, alkyl, alkenyl and aryl groups of 1 to 20 carbon atoms, and saturated and unsaturated cyclic groups of 3 to 12 carbon atoms which can be formed with one or more, preferably two, ring carbon atoms. In a preferred embodiment, the substituents are selected from hydrogen and alkyl groups of 1 to 2 carbon atoms. Generally speaking, the substituents on the cycloolefin monomers can be any which do not poison or deactivate the polymerization catalyst.

Examples of the preferred monomers referred to herein include dicyclopentadiene, methyltetracyclododecene, 2-norbornene, and other norbornene monomers such as 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, 5-phenyl-2-norbornene, and 5-dodecyl-2-norbornene. This invention especially contemplates preparation of homopolymers and copolymers of norbornene, methylnorbornene, tetracyclododecene, methyltetracyclododecene, dicyclopentadiene, trimers of cyclopentadiene, tetramers of cyclopentadiene, ethylidenenorbornenes, vinylnorbornenes, and hexacycloheptadecene. Copolymers are defined as polymers composed of two or more monomers. Dicyclopentadiene (DCPD), methylnorbornene (MNB), methyltetracyclododecene (MTD), and methylcyclopentadiene dimer (MCDD) have the following structures:

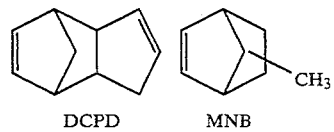

DCPD    MNB

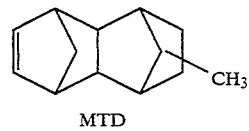

MTD

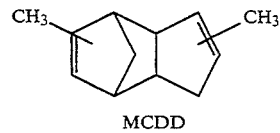

MCDD

The cycloolefin monomers contemplated herein also include monomers disclosed in Layer U.S. Pat. No. 4,301,306 and Layer U.S. Pat. No. 4,324,717, all of which contain the norbornene structure depicted above.

In solution polymerizations, the monomer or mixture of norbornene-type monomers can contain up to about 20% by weight thereof of at least one other polymerizable monomer devoid of a norbornene group. Such other polymerizable monomers are preferably selected from mono- and dicycloolefins containing 4 to 12 carbon atoms, preferably 4 to 8 carbon atoms, examples of which include cyclobutene, cyclopentene, cyclopentadiene, cycloheptene, cyclooctene, 1,5-cyclooctadiene, cyclodecene, cyclododecene, cyclododecadiene, and cyclododecatriene.

Suitable multifunctional monomers for RIM or bulk applications are bicyclic olefins containing 7 to 30 carbon atoms and 1 to 4 double bonds, preferably 8 to 14 carbon atoms and 2 to 3 double bonds, such as norbornadiene. As should be apparent, cycloolefins that cannot be polymerized by ring opening, i.e., cyclohexene and derivatives thereof, are not employed in the polymerization process of this invention except as solvent.

The activator referred to herein is generally a halometal compound which has the following formula:

$$R_m Y X_n$$

where m is 0 to 4 and n is 1 to 5. R is individually selected from organic radicals selected from hydrogen, alkyl, alkenyl, alkoxy, aryl, alkaryl and saturated and unsaturated cyclic groups. The quantity Y is a metal selected from tin, antimony, boron, germanium, and silicon. The quantity X is individually selected from halogens which include chlorine, bromine, iodine and fluorine, preferably chlorine. In a preferred embodiment, the initiator is selected from organic chlorosilanes of the following formula:

$$R_m Si X_n$$

where m is 0 to 3, and n is 1 to 4; R is individually selected from hydrogen, alkyl groups of 1 to 12 carbon atoms, alkoxy groups of 1 to 12 carbon atoms, alkenyl groups of 2 to 12 carbon atoms, aryl groups of 6 to 18 carbon atoms, alkaryl groups wherein there is at least one alkyl substituent on the aryl moiety containing 1 to 4 carbon atoms, and saturated and unsaturated monocyclic, dicyclic and polycyclic groups containing a total of 5 to 12 carbon atoms. In an especially preferred embodiment, R is selected from hydrogen, alkyl and alkoxy groups containing 1 to 6 carbon atoms. Specific examples of preferred activators include the following chlorosilanes: dimethylmonochlorosilane, dimethyldichlorosilane, diphenyldichlorosilane, tetrachlorosilane bicycloheptenylmethyldichlorosilane, phenylmethyldichlorosilane, dihexyldichlorosilane, and the like.

Amount of the activator is in the range of 0.05 to 10 millimoles per mole of cycloolefins polymerized, preferably 0.1 to 2.0 millimoles.

A typical bulk polymerization (or RIM) for preparing polymeric cycloolefins involves the step of combining a plurality of streams to form a reaction mixture, injecting the reaction mixture into a closed mold, allowing sufficient time for the reaction mixture to polymerize, and recovering a polymeric product in the shape of the mold. Depending on the cocatalyst chosen, the bulk or RIM reaction can be initiated upon mixing or the mixture can be thermally initiated in the mold. One stream contains the organoammonium molybdate or tungstate catalyst of the methathesis catalyst system, another stream contains the modified or unmodified cocatalyst of the methathesis catalyst system, at least one stream contains one or more cycloolefin monomers and, optionally, at least one other copolymerizable monomer, and, optionally, at least one stream contains an alcohol or other hydroxy-containing compound, and at least one stream contains the activator described herein. Only the catalyst must be maintained separately from the cocatalyst and introduced in a separate stream. The activator can be in either the modified or unmodified cocatalyst stream or it can be introduced diluted in a separate monomer stream.

Various additives can be included to modify the properties of cycloolefin polymers of the invention. Possible additives include fillers, flame retardants, reinforcing fibers, pigments, antioxidants, light stabilizers, plasticizers and polymeric modifiers. Because of the rapid polymerization time the additives must be incorporated before the dicyclopentadiene monomer sets up in the mold. It is often desirable that the additives be combined with one or both of the reactant streams before being injected into the mold. Fillers or fibers can also be charged to the mold cavity, prior to charging the reaction streams, if the fillers or fibers are such that the reaction stream can readily flow around them to fill the remaining void space in the mold. It is essential that the additives not adversely affect catalytic activity.

Flame retardant additives may be added to one or more of the monomer feed streams to form polymers which are resistant to burning. For example, on a weight basis, a flame retardant mixture of 17 parts of N,N'-ethylene-bis-tetrabromophthalimide, 7 parts $Sb_2O_3$, and 8 parts $NH_4BF_4$ as the flame retardant mixture per 100 parts of a polycycloolefin can be mixed with 0.05 parts $WCl_6$ and 0.15 parts of tri-n-octyl aluminum to form substantially crosslinked polymerized units of a cycloolefin such as dicyclopentadiene. This represents effective flame retardation. The range of weight portions for effective flame retardation is from 8 to 20 parts of N,N'-ethylene-bis-tetrabromophthalimide, from 6 to 15 parts $NH_4BF_4$ and from 3 to 11 parts $Sb_2O_3$ per 100 parts of cycloolefin such as dicyclopentadiene.

Suitable flame retardants can have either one or two components, the one component retardant is selected from at least one bromophenoxy derivative of at least one cyclic phosphazene while the two component retardant is an aryloxy derivative of at least one cyclic phosphazene combined with a brominated aromatic compound.

The one component flame retardant of this invention includes hexakis-(4-bromophenoxy) cyclotriphosphazene, hexakis-(2,4-dibromophenoxy) cyclotriphosphazene, hexakis-[4-tetrabromophthalimidophenoxy]-cyclotriphosphazene and an 80%–20% mixture of hexakis-(4-bromophenoxy)cyclotriphosphazene and octakis-(4-bromophenoxy)cyclotetraphosphazene respectively.

The one component flame retardant is incorporated into the thermoset polymer, based on the weight of the polymer, in an amount equal to achieve at least 1.5%, preferably 2.0%, phosphorous and at least 8.0%, preferably 10.3%, bromine. In a preferred embodiment, hexakis-(4-bromophenoxy) cyclotriphosphazene is 25% by weight of the thermoset polymer (2.0% P and 10.3% Br). At a maximum, the flame retardant can be about 50%, by weight, of the thermoset polymer (4.0% P and 20.6% Br).

Typical aryloxycyclic phosphazenes useful in making the two component flame retardants in accordance with this invention are, for example, hexaphenoxy cyclotriphosphazene, an 80%/20% mixture of hexaphenoxy cyclotriphosphazene and octaphenoxy cyclotetraphosphazene respectively, and octaphenoxy cyclotetraphosphaxene.

Typical brominated aromatic compounds useful in accordance with this invention are, for example, N,N'-ethylene-bis-(tetrabromophthalamide), brominated polystyrene, decabromodiphenyl oxide, tetrabromoxylene, brominated poly(phenylene oxide), and octabromodiphenyl oxide.

The two component flame retardant is incorporated into the thermoset polymer, based on the weight of the polymer, in an amount sufficient to achieve at least 0.9% phosphorous and at least 6.0% bromine. In a preferred embodiment, the thermoset polymer is 14% by weight N,N'-ethylene-bis(tetrabromophthalamide) and 6.9% by weight hexaphenoxy cyclotriphosphazene. At a maximum, the two component flame retardant can be about 50% by weight of the thermoset polymer (4.0% P and 25% Br).

A two-component flame retardant package that is especially useful if the heat distortion temperature of the polymer matrix is to be preserved comprises nonmonomer soluble brominated compounds such as decabromodiphenyl oxide or ethylene bistetrabromophthalimide in combination with antimony oxide. Total amount of the flame retardant, which includes the brominated compounds and the antimony oxide, is about 5 to 50 weight parts per 100 weight parts of polymer. Typically, the ratio of brominated compound to antimony oxide is 3.0 and the minimum level of total flame retardant necessary to achieve a UL-94VO rating is 20 parts per hundred of polymer.

The addition of an elastomer can increase the impact strength of the cycloolefin polymer 5 to 10 fold with only a slight decrease in flexural modulus. The elastomer can be dissolved in one or both of the monomer streams. The amount and type of elastomer used is determined by its molecular weight and by the initial viscosity desired in the streams to which it is added as well as its ability to impact modify the cycloolefin polymer. Amounts within the range of 1 to 10% by weight and preferably 2 to 5% by weight of the total stream can be used without causing an excessive increase in solution viscosity. An example of preferred elastomer is a styrene-butadiene block copolymer made by solution polymerization. The addition of about 6% of this elastomer to a dicyclopentadiene stream increases the viscosity to about 300 cps. The streams cannot be so viscous that adequate mixing of the streams is not possible, but increasing the viscosity to between about 300 cps and 1,000 cps improves the mold filling characteristics of the combined streams. The elastomer is preferably added to all streams of the formulation so that the viscosities of the streams are similar. When the streams have similar viscosities, more uniform mixing is obtained when the streams are combined. An increase in viscosity also reduces leakage from the mold and simplifies the use of fillers by decreasing the setting rate of solid filler materials.

Useful elastomers can be unsaturated hydrocarbon elastomers such as styrene-butadiene rubber, polyisoprene, polybutadiene, natural rubber, styrene-isoprene-styrene triblock rubber, styrene-butadiene-styrene triblock rubber, and ethylene-propylene diene terpolymers; or saturated elastomers such as polyisobutylene, styrene-ethylene-butylene-styrene block copolymers and ethylene-propylene copolymers.

It is believed that a saturated elastomer forms a semi-interpenetrating network when present during the polymerization of a cycloolefin, such as dicyclopentadiene. Unsaturated elastomers are believed to form interpenetrating networks with the polymerized units of cycloolefin, such as dicyclopentadiene, when present during the polymerization of the monomer. In either case, little or none of the elastomer can be removed by extraction.

Impact strength of polycycloolefins can also be significantly increased by the addition of an ester plasticizer. While ester plasticizers are well known in the art for use with polar polymers such as polyvinyl chloride, it is surprising that they should be useful with a methathesis-catalyzed thermoset hydrocarbon polymer such as poly(DCPD).

In general, the ester plasticizers have a molecular weight less than 750 and a boiling point higher than 150° C. It has been found that the most useful ester plasticizers are those that have a solubility parameter in the range of 7.8 to 10.2 $(cal/cc)^{\frac{1}{2}}$ This is the range that is most compatible with poly(DCPD) which has a solubility parameter of 9.3. In particular, it has been found that diester and glyceride plasticizers having a solubility parameter between about 7.8 and 10.2 $(cal/cc)^{\frac{1}{2}}$ give the best combination of good impact strength and high modulus. Typical of suitable ester plasticizers and their solubility parameters are the following: diethyl phthalate dihexyl phthalate, 9.7; dioctyl sebacate, 9.2; dibutyl sebacate, 9.5; di-n-octyl phthalate, 9.5; di(2-ethylhexyl) adipate, 9.2; di(n-octyl) adipate, 9.3; di(2-ethylhexyl) phthalate, 9.4; dibutyl phthalate, 10.2; tracetin, 10.1; olive oil, 9.0; tristearin, 9.0; and cotton seed oil, 9.0.

The amount of ester plasticizer added to polycycloolefins is not critical. The plasticizer can be present from about 5 pph to about 55 pph based on the volume of the monomer. A preferred amount is between 10 pph and 30 pph by volume. The amount will depend on the particular physical requirement of the polymer to be made and will be readily determinable by one skilled in the art.

Polybutene hydrocarbon elastomers can also be used as plasticizers. Suitable polybutene plasticizers are preferably liquid at room temperature. The level of such plasticizers can vary from 1 to 50%, preferably 2 to 10%.

Generally, the use of chlorosilane activators in conjunction with RIM polymerization of dicyclopentadiene (DCPD) has resulted in a number of important advantages. With these activators, DCPD RIM polymerization rate and percent conversion have been increased markedly. The in-mold rate of reaction has increased whereby the reaction exotherm causes a temperature increase of 80° to 110° C. in about 1–20 seconds with an activator whereas without the activator, the temperature increase is only about 10° to 60° C. in about 1 to 2 minutes. With the activators, polymerization conversion has increased from about 80 to 90% to in excess of 97%. These conversions are measured via thermogravimetric analysis (TGA), with all volatiles driven off before 400° C. is reached are counted as unconverted monomer. And lastly, the important advantage of being able to lower mold temperatures from approximately 95° C. to approximately 50° C. is realized. At lower mold temperatures, molded articles cool below their Tg's more quickly and, therefore, can be removed from the mold more quickly.

It should be apparent that with the chlorosilane activators disclosed herein, the reactions are characterized by quick exotherms. These exotherms show a temperature increase of at least 80° C. in 1 to 20 seconds, preferably 2 to 5 seconds, with mold temperatures as low as about 40 to 70° C. for about ⅛" thick parts. The conversions exceed 95% and preferably exceed 97% without post-cure. Polymerization is continued until conversions exceed 95%, preferably 97%, and are completed in less than about one-half minute, preferably 1–10 seconds, for fast polymerization systems and in less than about 5 minutes, preferably less than 2 minutes, for slow polymerization systems. Heat distortion temperature (HDT) of the polymers prepared with the halogen source described herein at conversions of 97% and above are about 110° C. and above. For example, homopolymers of dicyclopentadiene (DCPD) have HDT of 110° C. and above whereas copolymers of 92.5% DCPD and 7.5% cyclopentadiene trimer have HDT of 120°–125° C.

A different mix of advantages is realized in the use of the activators disclosed herein in RIM polymerization of methyl norbornene (MNB) or methyl tetracyclododecene (MTD) or copolymers thereof with other co-polymerizable monomers. Here, percent conversion for thicker samples ($\frac{1}{8}$" to $\frac{1}{4}$") appears to be about the same at about 96% with or without the activators whereas with thinner samples on the order of 1/32" to 1/16", conversions have increased from about 80% without activators to above 92% with the activators. The thinner samples of poly (MNB), poly (MTD) or copolymers thereof include films. The mold temperature here is also reduced substantially on the order of 20° to 40° C. or more and is advantageous because the maximum reaction temperature is lowered, allowing the production of molded objects with no or fewer voids and the molded object can be more quickly removed from the mold. The rate of reaction is increased with the use of activator in conjunction with other cycloolefins but the rate increase is not as pronounced as with DCPD.

With MNB or MTD, RIM polymerization is rapid with or without an activator whereas with DCPD, reaction is slower without an activator and rapid with an activator. In the case of DCPD, lower grades of this material can be used in RIM polymerization when employing an activator which would be impractical in absence of an activator. The rate of reaction should be controlled since too rapid polymerization of cycloolefins results in undesirable voids in the molded products. The voids are reduced or eliminated by slightly reducing the rate of reaction. This can be done by tempering the reducing power of the cocatalyst, as by employing more alcohol or a hydroxy-containing material in forming the modified cocatalyst.

In a preferred embodiment of RIM polymerization, the system includes a cycloolefin monomer which contains a norbornene group, a methathesis catalyst system which includes a catalyst and a cocatalyst, an alcohol to adjust the pot life of the polymerization system by modifying the reducing power of the cocatalyst, and a chlorosilane activator. The catalyst is an organoammonium molybdate or tungstate whereas the cocatalyst is an alkylaluminum chloride or a trialkylaluminum.

Solution polymerization does not normally use alcohol reaction with the alkylaluminum chloride. With molybdate or tungstate catalysts, polymerization activity increases very significantly as the cocatalyst is changed from diethylaluminum chloride to the ethylaluminum dichloride. The ethylaluminum sesquichloride functions well, and adding the silicon tetrachloride activator increases polymerization activity of the cocatalyst/catalyst system in solution polymerization.

A fast ring-opening polymerization system is defined as one wherein the monomers are polymerized in less than 30 seconds, preferably 1 to 10 seconds, at an elevated mold temperature of about 60° C. A fast polymerization system is characterized by the presence of an alcohol to provide sufficient pot life, dialkylaluminum chloride cocatalyst, an organoammonium molybdate catalyst, and silicon tetrachloride activator. In making thicker articles where the thickness can exceed about 1 inch in places, or for other reasons, a slower polymerization system can be used to obtain satisfactory and controllable polymerization. Such slower systems are defined as ones wherein polymerization time is greater than about 1 minute, preferably 1 to 2 minutes, at an elevated mold temperature of about 60° C. Such slower polymerization systems are characterized by the presence of an alcohol to provide sufficient pot life, trialkylaluminum or mixtures thereof with one or more alkylaluminum halides as cocatalyst, organoammonium molybdate catalyst, and silicon tetrachloride activator.

The following examples demonstrate the invention disclosed and claimed herein in connection with solution polymerization and RIM polymerization of cycloolefins.

EXAMPLE 1

This example demonstrates RIM polymerization of methylnorbornene. Ethylaluminum sesquichloride cocatalyst as a 0.5 molar aluminum solution in toluene, his (trioctylammonium) molybdate catalyst as a solution in toluene containing 0.1 gram-atom of molybdenum per liter of the solution, and 5-bicycloheptenylmethyldichlorosilane activator are used in the experiment. A small amount of a hindered phenol antioxidant, Ethanox-330, was also used in amounts indicated. The results of the experiments demonstrate faster rates, more rapid heat evolution and much higher conversions in instances where the chlorosilane compound was used. Compositions of samples A, B, C and D are given in Table I, below:

TABLE I

| Ingredients | Sample A | Sample B | Sample C | Sample D |
|---|---|---|---|---|
| MNB | 20 ml (18 g) | 20 ml (17 g) | 20 ml (17 g) | 20 ml (17 g) |
| Antioxidant | 0.05 g | 0.08 g | 0.05 g | — |
| Silane | 0.1 ml | — | — | 0.05 ml |
| Recovered Polymer | 7.0 g | 5.5 g | 2.2 g | 11.0 g |

The above ingredients were added to separate bottles A, B, C, D and the bottles were heated to 60° C. to solubilize the antioxidant and then the bottles were cooled to room temperature. Bottle D did not contain any antioxidant so it was not so heated.

To bottle A, 0.1 ml of the cocatalyst solution and 0.05 ml of the catalyst solution were added at room temperature. The bottle contents showed violent smoking and the bottle was very hot, indicating a vigorous reaction. After about a quarter of an hour cooling at room temperature, 80 ml of toluene was added to recover the polymer and this was followed immediately by addition of 2 ml of isopropanol short-stop. The polymer swelled to the total volume of solvent. Subsequently, isopropanol was added to coagulate the polymer. Most of the unreacted monomer was removed in the solvent/isopropanol mixture. The polymer was placed in a pan and toluene and more antioxidant were added before the polymer was dried.

To bottle B, 0.1 ml of the cocatalyst solution and 0.05 ml of the catalyst solution were added but no reaction took place. Several minutes thereafter, additional 0.025 ml of the catalyst solution was added, which resulted in observed reaction. To accelerate the reaction, additional 0.025 ml of the cocatalyst solution was added which completed the reaction. As with the bottle A experiment, 80 ml of toluene and 2 ml of isopropanol short stop were added to terminate the reaction. Polymer recovery was identical to A.

The contents of bottle C were initially cooled to 0° C. in an ice bath. Then, 0.1 ml of the cocatalyst solution and 0.05 ml of the catalyst solution were added and the bottle was placed back into the ice bath. There appeared to be no polymer formation. To initiate polymerization, the bottle was removed from the ice bath and an infra-red lamp was turned on to heat the bottle. At this point, the contents in the bottle were fluid. Subsequently, 0.05 ml of additional cocatalyst solution was added after cooling the bottle in the ice bath. The bottle was brought to room temperature and left overnight. As previously, 2 ml of isopropanol short stop and 80 ml of toluene were added to terminate the reaction. Polymer recovery was similar to A. Some liquid on the polymer was poured off and the polymer placed in a pan and air-dried. A small amount of a soft sample was obtained with a rough surface that was light in color and transparent.

The contents of bottle D were also initially cooled to 0° C. in an ice bath. Again, 0.1 ml of the cocatalyst solution and 0.05 ml of the catalyst solution were added to the bottle and the infra-red lamp was turned on. Since the bottle contents became viscous almost immediately, the lamp was turned off after 2 minutes. The bottle became very hot, and the contents became rigid and nonflowing. The bottle D was left at room temperature overnight. Then, 2 ml of isopropanol and 80 ml of toluene were added to the bottle to terminate reaction and to swell the polymer. After adding alcohol to precipitate the polymer, the liquid was poured off from the polymer and the polymer was air dried. The recovered polymer sample had a nearly smooth surface, was light in color and transparent.

As is apparent from Table I, recovered weight of polymer for bottles A, B, C and D were 7.0 grams, 5.5 g, 2.2 g and 11.0 g, respectively. The data in Table I indicates greater conversions in experiments where a chlorosilane compound was used. Reaction rates were faster and resulting temperatures higher in the resulting experiments with the chlorosilane present.

EXAMPLE 2

This example demonstrates RIM polymerization of methyltetracyclododecene (MTD) in the presence of a methathesis catalyst system which includes a catalyst and a cocatalyst, in the presence of certain chlorosilane compounds. This example also demonstrates the need for a reducing agent such as alkylaluminum, in the cocatalyst for the reaction to take place.

Bis(trioctylammonium)hexamolybdate, 0.2 gram-atoms of molybdenum per liter of the MTD solution, was used as the catalyst. The cocatalyst was 0.5 molar solution of triethylaluminum in MTD or a 0.5 molar solution of diethylaluminum chloride and 2-propanol (molar ratio of 1/1.25) in MTD. The chlorosilane compounds used were a 0.5 molar solution of diphenyldichlorosilane in MTD and a 0.5 molar solution of dimethyldichlorosilane in MTD.

Initially, bottles A, B, C and D all contained 0.3 g of antioxidant and 20 ml of MTD. The bottles were heated to 60° C. to solubilize the Ethanox Ⓡ 330 antioxidant and then cooled to about 30° C.

To bottle A were added 0.3 ml of the dimethyldichlorosilane solution, 0.2 ml of catalyst solution, and again an additional 0.3 ml of dimethyldichlorosilane solution. No reaction was observed to this point. Then, on addition of 0.1 ml of the triethylaluminum cocatalyst solution, reaction was observed.

To bottle B were added 0.3 ml of the cocatalyst solution of diethylaluminum chloride and 2-propanol and 0.2 ml of the catalyst solution. Reaction was observed immediately. This experiment serves as the control for this series of experiments.

To bottle C were added 0.3 ml diphenyldichlorosilane solution and 0.2 ml of the catalyst solution. No reaction was evident. A further addition of 0.2 ml of the catalyst solution and 0.3 ml of diphenyldichlorosilane solution were added to bottle C but no reaction was evident. Then, about one-half hour after inception of this experiment, one drop of triethylaluminum solution was added followed by an additional two drops of triethyl aluminum solution. Reaction became readily apparent after addition of the triethylaluminum cocatalyst solution.

To bottle D were added 0.1 ml of dimethyldichlorosilane solution and 0.2 ml of the diethylaluminum chloride and 2-propanol cocatalyst solution. No reaction was observed. Then, 0.2 ml of the catalyst solution was added to bottle D.

Reaction was observed on addition of the catalyst solution, which indicates the necessary presence of a methathesis catalyst and cocatalyst.

Further addition of 0.1 ml of triethylaluminum cocatalyst solution, accelerated the reaction.

EXAMPLE 3

This experiment shows that without a chlorosilane, conversion rates are in the low 80s, which is too low for commercial applications. This experiment, therefore, is not illustrative of the invention claimed herein.

The alcohol here was used in the form of 0.5 molar solution of propanol in dicyclopentadiene (DCPD). Diethylaluminum chloride (DEAC) was used in the form of a 0.5 molar solution thereof also in DCPD. The catalyst here was tri(tridecylammonium) octamolybdate and was used containing 0.1 gram-atom of molybdenum per liter of the DCPD solution.

The procedure herein involved dissolving the antioxidant and impact modifier in DCPD in a bottle and sequentially adding the alcohol solution, the DEAC cocatalyst solution, and lastly the molybdenum catalyst solution. It is preferred to mix the alcohol and DEAC together before adding the chlorosilane to avoid bringing the chlorosilane in contact with alcohol which results in a reaction and depletion of the alcohol.

Before addition of the catalyst, the bottle containing all the other ingredients is evacuated to remove gases which produce bubbles in the molded piece. The bottle is also evacuated after addition of the catalyst for 1-2 minutes to also remove bubbles of gas. The bottle contents are then poured into a mold formed by a pair of parallel stainless steel plates preheated to a mold temperature of 55° C. After about 5-10 minutes, the mold is opened and a molded object is removed. A thermocouple protrudes 1-1.5 cm from the bottom edge of the mold into the mold cavity and measures the temperature of the ingredients in the mold.

In this instance, the following were added to a bottle:

(a) 75 ml of 99% DCPD
(b) 0.75 ml of Ethanox 744 antioxidant
(c) 3.3 ml of 0.5 molar propanol solution
(d) 3.0 ml of 0.5 molar DEAC solution
(e) 3.0 ml of 0.1 gm-atom molybdenum/liter of tri(-tridecylammonium) octamolybdate solution.

The contents of the bottle were poured into a mold preheated to 100° C. and were kept in the mold at 100° C. for 10 minutes and then removed. Conversion of the DCPD monomer to the polymer was calculated to be 82.5%.

EXAMPLE 4

This experiment demonstrates the improved conversion obtained when dimethylchlorositane was used to activate a RIM polymerization of a charge of 95/5 DCPD/MTD comonomers. The ratio of the comonomers is on a weight basis. The procedure set forth in Ex. 3 was followed with the following exceptions:
1. 75 g of the monomer charge was used plus 7.5 g of Kraton G 1652 impact modifier
2. 1.5 ml of Ethanox 744 antioxidant was used
3. 0.6 ml of 1.0 molar dimethylchlorosilane solution in DCPD
4. 4.0 ml of the 0.5 molar propanol solution With the dimethylchlorosilane activator, conversion of the 95/5 DCPD/MTD monomer charge was 96.1%.

EXAMPLE 5

This experiment demonstrates the high conversion obtained with tetrachlorosilane in RIM polymerization of 97% DCPD following the procedure outlined above.

The following components in the amounts indicated were used:

| | |
|---|---|
| 97% DCPD | 75 ml |
| Kraton G 1652 Impact Modifier | 1.9 g |
| 0.25 Molar SiCl$_4$ Solution | 1.8 ml |

| | |
|---|---|
| 1.0 Molar Isopropanol Solution | 1.6 ml |
| 0.5 Molar DEAC Cocatalyst Solution | 3.6 ml |
| 0.1 gm-atom Molybdenum/liter of Molybdenum Catalyst Solution | 4.5 ml |

In carrying out this polymerization, the mold temperature was 55° C., maximum temperature attained during the exotherm was 157° C., the reaction exotherm took off at 60° C. and had a temperature rise of 97° C., time to exotherm was 3 minutes and 4 seconds, from beginning of exotherm to peak temperature was 30 seconds, from peak temperature down to 80° C. took 47.1 seconds to cool, and the pot life of the reaction mixture at room temperature was 20 minutes. Conversion attained here was a very impressive 98.25%.

Using 99% DCPD and MTD in the respective weight ratio of 95/5, with the tetrachlorosilane activator, a conversion of 99% was attained.

EXAMPLE 6

This experiment demonstrates RIM polymerization of methyltetracyclododecene (MTD) in the presence and absence of tetrachlorosilane activator.

In carrying out these polymerizations, the following solutions were used:
0.5 Molar DEAC in MTD
1.0 Molar Isopropanol in MTD
0.1 gm-atom Molybdenum/liter of Molybdenum Catalyst in MTD
0.25 Molar Tetrachlorosilane in MTD DEAC, as previously, is a contraction for diethylaluminum chloride cocatalyst and the molybdenum catalyst was tri(tridecylammonium) octamolybdate.

The procedure here was similar to the procedure in the other examples. Pursuant to this procedure, bottles were dried for at least one hour at 105° C., then removed and cooled to room temperature under a nitrogen purge. In the order given, the monomer, cocatalyst solution, alcohol solution, activator solution, and catalyst solution were then added to the bottle, with mixing after each addition. A pouring spout with a nitrogen inlet was placed on the bottle and the bottle was inverted to inject its contents into a preheated nitrogen-purged mold consisting essentially of a pair of spaced stainless steel plates. Temperature of the ingredients in the mold was recorded with a thermocouple placed about 1 to 1½ cm from the bottom edge of the plaque that was formed in the mold. The plaque was 6"×6" and a thickness of ⅛". After about 10 minutes, the mold was opened and the plaque was removed. Conversion was determined by TGA analysis wherein all volatiles driven off before 400° C. was reached were counted as unreacted monomer.

The experimental recipes set forth in Table A were mixed in bottles and then injected into a mold preheated to 75° C.

TABLE A

| Sample No. | MTD Monomer | 0.5 M DEAC Soln. mls | 1 M ROH Soln mls | Molar Ratio ROH/DEAC | 0.1 gm-atom Mo/liter mls | 0.25 M SiCl$_4$ mls |
|---|---|---|---|---|---|---|
| A | 100 g | 3.0 | 2.10 | 1.4 | 4.0 | 0.0 |
| B | 100 g | 3.0 | 2.10 | 1.4 | 4.0 | 1.5 |
| C | 100 g | 3.0 | 1.80 | 1.2 | 4.0 | 0.0 |
| D | 100 g | 3.0 | 1.80 | 1.2 | 4.0 | 1.5 |

In the above experiments, the catalyst was tri(-tridecylammonium) octamolybdate solution in MTD.

The results are set forth in Table B, below:

TABLE B

| Sample No. | Cl-Si Soln. | TTh min. | EET min. | M$_x$RT °C. | IT$_p$ °C. | % Conv. |
|---|---|---|---|---|---|---|
| A | 0 | 94 | 2.5 | 139 | 78 | 93.1 |
| B | 1.5 | 11 | 2.5 | 181 | 76 | 96.3 |
| C | 0 | 35 | 1.6 | 183 | 80 | 94.3 |
| D | 1.5 | 5 | 1.3 | 200 | 78 | 95.9 |

In the above Table B, TTh represents time to thickening or pot life of the reaction mixture, EET represents the elapsed time from the time of pouring to the beginning of the sharp rise in temperature (i.e., exotherm), M$_x$RT is the maximum recorded temperature reached by the plaque in the mold, and IT$_p$ is the initiation temperature.

The above experiments demonstrate the higher conversions and higher polymerization rates obtained when a chlorosilane is used in the reaction mixture.

EXAMPLE 7

This experiment demonstrates impact modification of polycycloolefin copolymers.

A number of experiments were carried out by including a small amount of an elastomer in preparing a 90/10 copolymer of dicyclopentadiene and ethylidene norbornene by reaction injection molding using an ammonium molybdate catalyst, i.e., $[(C_{12}H_{25})_3NH]_4Mo_8O_{26}$, and diethylaluminum chloride cocatalyst modified with n-propanol in the presence of an activator. The elastomer used herein was either a styrene-butadiene block copolymer (Kraton DX 1184) or a high molecular weight polybutadiene (Diene 55). The activator in all cases was 0.25% silicon tetrachloride in a mixture of the dicyclopentadiene and ethyldiene norbornene monomers. The antioxidant (AO) used was Ethanox 702.

The polymerizations were carried out by dissolving impact modifier and antioxidant in the monomer mixture. Next, 1.0M propanol was added and mixed, followed by slow addition with mixing of the diethylaluminum chloride cocatalyst. The silicon tetrachloride activator was then added to the mixture which was followed by pulling vacuum for a couple of minutes to remove dissolved gases. This was followed by the addition of the ammonium molybdate catalyst with constant agitation and the resulting mixture was poured into a plaque mold held at a temperature of 60° C. wherein the mixture polymerized to the final product. Experimental data is summarized in Table 7A, below:

TABLE 7A

| Cycloolefin Mixture | Mixture Wt. (gm) | ENB (mls) | 0.5 M DEAC (mls) | 1.0 M n-PrOH (mls) | 0.1 N Mo Catalyst (mls) | 0.25 SiCl₄ (mls) | ROH/Al |
|---|---|---|---|---|---|---|---|
| 1. 92.5/7.5 DCPD/ENB | 147.9 | 6.6 | 8.0 | 4.0 | 10.0 | 8.0 | 1.0 |
| 2. 92.5/7.5 DCPD/ENB | 154.9 | 4.9 | 8.0 | 4.0 | 10.0 | 8.0 | 1.0 |
| 3. 92.5/7.5 DCPD/ENB | 154.9 | 4.9 | 4.0 | 4.0 | 10.0 | 8.0 | 1.9 |
| 4. 95/5 DCPD/ENB | 78.7 | — | 4.0 | 1.8 | 5.0 | 4.0 | 1.0 |
| 5. 95/5 DCPD/ENB | 77.8 | — | 4.0 | 1.8 | 5.0 | 4.0 | 0.9 |
| 6. 90/10 DCPD/ENB | 79.0 | — | 4.0 | 2.0 | 5.0 | 4.0 | 1.0 |

| Cycloolefin Mixture | AO (gms) | Elastomer (gm) | Mold Temp. °C. | Max. Temp. °C. | % Conv. | Izod @ RT ft.-lbs./in. |
|---|---|---|---|---|---|---|
| 1. 92.5/7.5 DCPD/ENB | 2.0 | Kraton - 5.0 | 60 | 169 | 97.1 | 12.0 |
| 2. 92.5/7.5 DCPD/ENB | 2.0 | Kraton - 5.0 | 60 | 183 | 97.8 | 10.3 |
| 3. 92.5/7.5 DCPD/ENB | 2.0 | Kraton - 5.0 | 60 | 176 | 96.7 | 9.0 |
| 4. 95/5 DCPD/ENB | 2.0 | Kraton - 5.0 | 70 | 172 | 97.6 | 10.3 |
| 5. 95/5 DCPD/ENB | 1.0 | Diene - 2.5 | 70 | 188 | 97.1 | 11.3 |
| 6. 90/10 DCPD/ENB | 2.0 | Diene - 2.5 | 60 | 165 | 96.3 | 11.1 |

Without impact modification, impact strength of a polycycloolefin copolymer dicyclopentadiene and ethylidene norbornene is on the order of 1 ft.-lb./in. whereas impact modification thereof raises impact strength on the order of 10 times. In experiment 1, 6.6 mols of additional ENB comonomer was added to 147.8 grams of the 92.5/7.5 DCPD/ENB comonomer mixture, as shown in the table above. In experiments 4, 5 and 6, no additional ENB was added. The DCPD/ENB mixtures were prepared in advance for the convenience of having a liquid at room temperature since high purity DCPD is solid at room temperature.

We claim:

1. A process for producing a polymer which comprises polymerizing, in bulk within a mold, cycloolefin monomers comprising dicyclopentadiene or a mixture of dicyclopentadiene and another cycloolefin containing a norbornene group in the presence of a metathesis ring-opening polymerization catalyst system and an activator and continuing polymerization until conversion of said cycloolefin monomer in excess of 95%, measured by thermogravimetric analysis, is achieved, wherein the polymerization catalyst system comprises:
   (a) an organoammonium molybdate or organoammonium tungstate; and
   (b) an alkylaluminum compound and the activator has the following formula $R_mYX_n$, wherein n is 1–4, m is 0–3, R is hydrogen, Y is silicon and X is chlorine, and is selected from monochlorosilanes, dichlorosilanes, trichlorosilanes and tetrachlorosilanes.

2. Process of claim 1 wherein said cycloolefin is selected from substituted dicyclopentadienes; substituted and unsubstituted norbornenes, dihydrodicyclopentadienes, trimers of cyclopentadienes, tetramers of cyclopentadienes, tetracyclododecenes, hexacycloheptadecenes, ethylidenenorbornenes, vinylnorbornenes, and mixtures thereof, and wherein substituents on the monomers are selected from alkyl, alkenyl, and aryl groups of 1 to 20 carbon atoms, saturated and unsaturated cyclic groups of 3 to 12 carbon atoms which can be formed with at least one ring carbon atom, and mixtures thereof.

3. Process of claim 2 wherein said substituents on said cycloolefin is selected from alkyl groups of 1 to 2 carbon atoms; and wherein polymerization of the monomers is carried out in the presence of 1 to 10% of an elastomer, based on the weight of said monomer(s).

4. Process of claim 1 wherein said monomer is selected from trimers of cyclopentadienes, tetramers of cyclopentadienes, methyltetracyclododecene, norbornene, ethylidenenorbornene, vinylnorbornene, alkyl and alkenyl norbornenes containing 1 to 12 carbon atoms in the alkyl or alkenyl group, and mixtures thereof; and wherein polymerization of the monomer(s) is carried out in the presence of 1 to 10% hydrocarbon elastomer selected from saturated and unsaturated elastomers, amount of said elastomer is based on the weight of said monomer(s).

5. Process of claim 2 wherein the ring opening polymerization includes the mixing of multiple streams containing the metathesis catalyst system and said activator, and injecting the mixture into a mold where the ring opening polymerization is conducted.

6. Process of claim 5 wherein said cycloolefin is selected from norbornene, alkyl norbornenes containing 1 to 2 carbon atoms in the alkyl group, methyltetracyclododecene, ethylidenenorbornene, vinylnorbornene, and mixtures thereof; and wherein heat distortion temperature of the polymer is at least 110° C.

7. Process of claim 6 wherein said activator is selected from chlorosilanes which results in a fast reaction with a quick exotherm in a period of 1 to 20 seconds at mold temperatures of about 40° to 70° C.

8. Process of claim 1 wherein said alkylaluminum compound is selected from trialkylaluminum and dialkylaluminum chloride, alkylaluminum sesquichloride, alkylaluminum dichloride, alkyl alkoxy aluminum chloride, alkoxy aluminum, dialkoxy alkyl aluminum and mixtures thereof, wherein the alkyl group in said alkyl aluminum compound contains 2 to 8 carbon atoms.

9. Process of claim 8 wherein said activator is selected from chlorosilanes which result in ring opening polymerization that is faster, that is carried out at a lower mold temperature and that leads to higher conversions of monomer(s) to polymer, and the amount of said activator is 0.05 to 10.0 millimoles per mole of the monomer(s).

10. Process of claim 8 wherein said activator is selected from monochloro silanes, dichloro silanes, trichloro silanes, tetrachloro silanes, and mixtures thereof which increase the polymerization rate of the monomer(s), and the amount of said activator is 0.1 to 2.0 millimoles per mole of monomer(s).

11. Process of claim 1 wherein said activator is tetrachlorosilane.

12. Process of claim 1 wherein polymerization of the monomer(s) is carried out in the presence of 1 to 10% of a hydrocarbon elastomer selected from saturated and unsaturated elastomers, and the amount of said elastomer is based on the weight of said monomer(s).

13. Process of claim 1 wherein polymerization of the monomer(s) is carried out in the presence of 5 to 55 pph of an ester plasticizer having solubility parameter of from about 7.8 to about 10.2, the amount of said ester plasticizer is based on the volume of said monomer(s), said plasticizer is selected from diethyl phthalate, dihexyl phthalate, dioctyl sebacate, dibutyl sebacate, di-n-octyl phthalate, di(2-ethylhexyl) adipate, di(n-octyl) adipate, di(2-ethylhexyl) phthalate, and dibutyl phthalate; and the amount of said ester plasticizer is 10 to 30 pph.

14. Process of claim 1 wherein polymerization of the monomer(s) is carried out in the presence of a flame retardant selected from a bromophenoxy derivative of at least one cyclic phosphazene, and a combination of an aryloxy derivative of at least one cyclic phosphazene with a brominated aromatic compound.

15. Process of claim 14 wherein the amount of said flame retardant is sufficient to achieve at least 1.5% phosphorous and in instances when the two-component flame retardant is used, at least 8.0% of bromine, based on the weight of said monomer(s), said brominated aromatic compound is selected from N,N'-ethylene-bis-(tetrabromophthalimide), brominated polystyrene, decabromodiphenyl oxide, tetrabromoxylene, brominated poly(phenylene oxide), or octabromodiphenyl oxide, and mixtures thereof.

16. A process for producing a polymer which comprises, in bulk within a mold, cycloolefin monomers comprising dicyclopentadiene or a mixture of dicyclopentadiene and another cycloolefin containing a norbornene group in the presence of a metathesis ring-opening polymerization catalyst system and an activator and continuing polymerization until conversion of said cycloolefin monomers in excess of 95%, measured by thermogravimetric analysis, is achieved, wherein the polymerization catalyst system comprises:
  (a) an organoammonium molybdate or organoammonium tungstate; and
  (b) an alkylaluminum compound and
the activator is $SiCl_4$.

17. A process as in claim 16, wherein the ring-opening polymerization includes the mixing of multiple streams containing the metathesis catalyst system and said activator and injecting the mixture into a mold where the ring-opening polymerization is conducted.

18. A process for preparing a polymer, comprising the steps of:
  (1) polymerizing in a mold one or more monomers containing a norbornene group in the presence of a metathesis ring opening catalyst system and 0.1 to 2.0 millimoles of an activator per mole of monomer(s),
  (2) continuing the polymerization step until conversion of said monomer(s) in excess of 95%, measured by thermogravimetric analysis, is achieved, and
  (3) removing from the mold the solid polymer,
  wherein said monomer is selected from the group consisting essentially of dicyclopentadiene, trimers and tetramers of cyclopentadiene, methylnorbornene, methyltetracyclododecene, ethylidenenorbornene, vinylnorbornene, and mixtures thereof;
  wherein the metathesis catalyst system comprises a catalyst and cocatalyst, wherein the catalyst is selected from the group consisting essentially of organoammonium molybdates, organoammonium tungstates, and mixtures thereof; the cocatalyst is selected from the group of alkyl aluminum compounds consisting essentially of trialkylaluminum, dialkylaluminum chloride, dialkylalkoxyaluminum, dialkoxyalkylaluminum, alkylaluminum sesquichloride, alkylaluminum dichloride, alkoxyalkylaluminum chloride, aryloxyalkylaluminum chloride, and mixtures thereof, wherein the alkyl group in said cocatalyst contains 2 to 8 carbon atoms; and the activator is selected from the group consisting essentially of bicycloheptenylmethyldichlorosilane, dimethyldichlorosilane, diphenyldichlorosilane, phenylmethyldichlorosilane, dihexyldichlorosilane, and mixtures thereof; and
  wherein said ring opening polymerization includes the mixing of multiple streams containing said metathesis catalyst system and said activator, and injecting the mixture into a mold where said ring opening polymerization is conducted.

19. A process of claim 18, wherein polymerization of said monomers is carried out in the presence of 1 to 10% of an elastomer, based on the weight of said monomer(s).

20. A process of claim 18, wherein-polymerization of said monomer(s) is carried out in the presence of an ester plasticizer selected from diethyl phthalate, dihexyl phthalate, dioctyl sebacate, dibutyl sebacate, di-n-octyl phthalate, di(2-ethylhexyl) adipate, di(n-octyl) adipate, di(2-ethylhexyl) phthalate, and dibutyl phthalate; and the amount of said ester plasticizer is 10 to 30 pph based on said monomer(s).

21. A process of claim 18, wherein polymerization of said monomer(s) is carried out in the presence of a flame retardant selected from a bromophenoxy derivative of at least one cyclic phosphazene, and a combination of an aryloxy derivative of at least one cyclic phosphazene with a brominated aromatic compound.

22. A process of claim 18, wherein amount of said flame retardant is sufficient to achieve at least 1.5% by weight phosphorous and in instances when the two-component flame retardant is used, at least 8.0% by weight of bromine, based on the weight of said monomer(s), and said brominated aromatic compound is selected from N,N'-ethylene-bis-(tetrabromophthalimide), brominated polystyrene, decabromodiphenyl oxide, tetrabromoxylene, brominated poly(phenylene oxide), or octabromodiphenyl oxide, and mixtures thereof.

23. A process for producing a polymer which comprises polymerizing, in bulk, dicyclopentadiene or a mixture of dicyclopentadiene and another cycloolefin containing a norbornene group in the presence of a metathesis ring-opening polymerization catalyst system and an activator, wherein the polymerization catalyst system comprises:
  (a) a molybdenum or tungsten compound, and
  (b) an alkyl aluminum compound, and
the activator is an organic chlorosilane of the formula $R_mSiX_n$ where m is 1 to 3, n is 1 to 3, the sum of n+m is 4, x is chlorine, and R is hydrogen, alkyl, aryl or alkaryl, said chlorosilane containing at least one alkyl, aryl or alkaryl group.

24. A process for preparing a solid polymer by ring-opening polymerization comprising the steps of:
  (1) polymerizing in a mold one or more monomers containing a norbornene group in the presence of a metathesis ring-opening catalyst system and 0.1 to 2.0 millimoles of an activator per mole of monomer(s), and
  (2) removing from the mold the solid polymer, wherein said norbornene group is of the formula

wherein the metathesis catalyst system comprises a catalyst and cocatalyst, wherein the catalyst is selected from molybdenum compounds, tungsten compounds and mixtures thereof, the cocatalyst is comprised of one or more alkyl aluminum compounds, and the activator is selected from the group consisting essentially of bicycloheptenyl-methyldichlorosilane, dimethyldichlorosilane, diphenyldichlorosilane, phenylmethyldichlorosilane, dihexyldichlorosilane, and mixtures thereof; and wherein said ring-opening polymerization includes the mixing of multiple streams containing said metathesis catalyst system and said activator, and injecting the mixture into a mold where said ring-opening polymerization is conducted.

25. A process of claim 24, wherein said monomer is selected from dicyclopentadiene, trimers of cyclopentadienes, tetramers of cyclopentadienes, methyltetracyclododecene, norbornene, ethylidenenorbornene, vinylnorbornene, alkyl and alkenyl norbornenes containing 1 to 12 carbon atoms in the alkyl or alkenyl group, and mixtures thereof; and wherein polymerization of said monomer(s) is carried out in the presence of 1 to 10% hydrocarbon elastomer selected from saturated and unsaturated elastomers, wherein the amount of said elastomer is based on the weight of said monomer(s).

26. A process of claim 23, wherein said ring-opening polymerization includes the mixing of multiple streams containing said metathesis catalyst system and said activator, and injecting the mixture into a mold where said ring-opening polymerization is conducted.

27. A process of claim 23, wherein the tungsten and molybdenum compounds are selected from organoammonium molybdates and organoammonium tungstates and wherein said alkylaluminum compound is defined by the formula

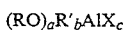

wherein R and R' are individually selected from hydrogen, alkyl, aryl, alkenyl, alkaryl and saturated and unsaturated monocyclic, dicyclic and polycyclic groups, X is a halogen, and a, b and c represent equivalents of RO, R, and X, respectively, where a is 0 to 2, b is 0.6 to 3 and c is 0 to 2, provided that the sum of a, b and c is 3.

28. A process of claim 23, wherein said activator is selected from organic chlorosilanes which provide an exotherm in a period of 1 to 20 seconds at mold temperatures of about 40 to 70° C.

29. A process of claim 23, wherein polymerization of said monomer(s) is carried out in the presence of 1 to 10% of a hydrocarbon elastomer selected frown saturated and unsaturated elastomers based on the weight of said monomer(s).

30. A process of claim 23, wherein polymerization of said monomer(s) is carried out in the presence of an ester plasticizer selected from diethyl phthalate, dihexyl phthalate, dioctyl sebacate, dibutyl sebacate, di-n-octyl phthalate, di(2-ethylhexyl) adipate, di(n-octyl) adipate, di(2-ethylhexyl) phthalate, and dibutyl phthalate; and the amount of said ester plasticizer is 10 to 30 pph based on said monomer(s).

31. A process of claim 23, wherein polymerization of said monomer(s) is carried out in the presence of a flame retardant selected from a bromophenoxy derivative of at least one cyclic phosphazene, and a combination of an aryloxy derivative of at least one cyclic phosphazene with a brominated aromatic compound.

32. A process of claim 31, wherein amount of said flame retardant is sufficient to achieve at least 1.5% by weight phosphorous and in instances when the two-component flame retardant is used, at least 8.0% by weight of bromine, based on the weight of said monomer(s), and said brominated aromatic compound is selected from N,N'-ethylene-bis-(tetrabromophthalimide), brominated polystyrene, decabromodiphenyl oxide, tetrabromoxylene, brominated poly(phenylene oxide), or octabromodiphenyl oxide, and mixtures thereof.

* * * * *